United States Patent
Lydon et al.

(10) Patent No.: US 6,680,939 B1
(45) Date of Patent: Jan. 20, 2004

(54) EXPANDABLE ROUTER

(75) Inventors: Donald S. Lydon, Grass Valley, CA (US); Charles S. Meyer, Nevada City, CA (US); Kevin J. Shuholm, Grass Valley, CA (US); Jeffrey S. Evans, Grass Valley, CA (US)

(73) Assignee: NVision, INC, Grass Valley, CA (US)

( * ) Notice: Subject to any disclaimer, the term of this patent is extended or adjusted under 35 U.S.C. 154(b) by 382 days.

(21) Appl. No.: 09/661,844

(22) Filed: Sep. 14, 2000

(51) Int. Cl.[7] ............................................... H04L 12/50
(52) U.S. Cl. ....................................... 370/366; 370/386
(58) Field of Search ................................ 370/360, 357, 370/355, 362, 364, 367, 380, 386, 387, 388, 389, 392, 395.1, 423, 390, 366, 427; 379/290; 340/2.27, 2.28

(56) References Cited

U.S. PATENT DOCUMENTS

| | | | | |
|---|---|---|---|---|
| 4,792,970 A | * | 12/1988 | Molnar ........................ 379/290 |
| 4,796,254 A | * | 1/1989 | van Baardwijk et al. ... 370/366 |
| 5,008,878 A | * | 4/1991 | Ahmadi et al. .............. 370/353 |
| 5,016,245 A | | 5/1991 | Lobjinski et al. |
| 5,148,428 A | * | 9/1992 | Lee ............................... 370/422 |
| 5,214,640 A | * | 5/1993 | Sakurai et al. .............. 370/355 |
| 5,319,639 A | * | 6/1994 | Guha ........................... 370/427 |
| 5,369,633 A | * | 11/1994 | Maruyama et al. ......... 370/366 |
| 5,377,181 A | * | 12/1994 | Rogers ........................ 370/366 |
| 5,381,409 A | * | 1/1995 | Folkert de Vries ......... 370/392 |
| 5,479,608 A | * | 12/1995 | Richardson ............ 340/825.01 |
| 5,499,239 A | * | 3/1996 | Munter ........................ 370/423 |
| 5,550,815 A | * | 8/1996 | Cloonan et al. ............. 370/396 |
| 5,796,732 A | * | 8/1998 | Mazzola et al. ............. 370/362 |
| 5,796,733 A | * | 8/1998 | Norris ......................... 370/366 |
| 5,859,844 A | * | 1/1999 | Kanno et al. ................ 370/357 |
| 6,088,329 A | * | 7/2000 | Lindberg et al. ............ 370/387 |

FOREIGN PATENT DOCUMENTS

EP 0 759 594 A2 2/1997

* cited by examiner

Primary Examiner—Chau Nguyen
Assistant Examiner—Andy Lee
(74) Attorney, Agent, or Firm—John Smith-Hill; Smith-Hill and Bedell (57) ABSTRACT

A routing switch includes a first router module having N1 signal input terminals, M1 signal output terminals, an expansion input terminal and an expansion output terminal and including a core for routing a signal received at any one of the N1 signal input terminals selectively to any one or more of the output terminals and for routing a signal received at the expansion input terminal selectively to any one or more of the N1 signal output terminals. The router further includes a second router module having N2 signal input terminals, M2 signal output terminals, an expansion input terminal and an expansion output terminal and including a core for routing a signal received at any one of the N2 signal input terminals selectively to any one or more of the output terminals and for routing a signal received at the expansion input terminal selectively to any one or more of the M2 signal output terminals. The expansion output terminal of the first router module is connected to the expansion input terminal of the second router module and the expansion output terminal of the second router module is connected to the expansion input terminal of the first router module.

11 Claims, 4 Drawing Sheets

EXPANDABLE ROUTER

The subject matter disclosed in this application is related to subject matter disclosed in co-pending patent applications Ser. No. 09/661,845 and No. 09/661,842, the entire disclosure of each of which is hereby incorporated by reference herein for all purposes.

BACKGROUND OF THE INVENTION

This invention relates to an expandable router.

A broadcast switch for distributing a signal from one source to multiple destinations typically has N signal input terminals connected to respective signal sources, M signal output terminals connected to respective destinations and a switch core which can direct an input signal received at any one of the N input terminals to a group {m1} of output terminals. The switch will normally include interface circuitry for adapting the input signal to the operating requirements of the switch core and for restoring the output signal of the switch core to the same form as the input signal. Preferably, the switch core is non-blocking, i.e. the connection between any one of the N input terminals and any one of the M output terminals can be made regardless of the existing connection(s) made by the switch core. Ideally, the switch core can also direct the signal received at a second of the N input terminals to a group {m2} of output terminals, where {m1} and {m2} are mutually exclusive. A rectangular crosspoint matrix composed of N input buses, M output buses and N×M switch elements, where each switch element can connect a unique combination of one input bus and one output bus, can be used to provide a switch core that meets these requirements. A rectangular crosspoint matrix works well as a switch core but is subject to the disadvantage that the cost of the switch core depends roughly on the number of switch elements, and hence on the product of the number of inputs and the number of outputs, rather than on the sum of the number of inputs and the number of outputs.

Figure 1:
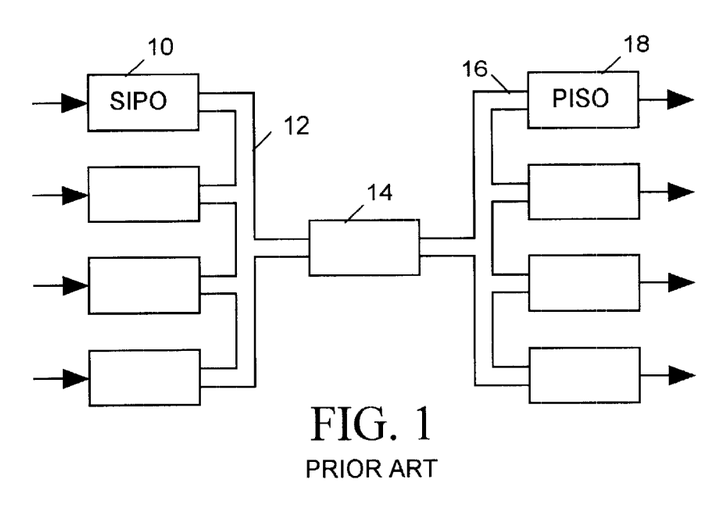
FIG. 1 is a schematic diagram of a time domain multiplexing switching core.

It is also known to use time division multiplexing (TDM) in a switch core for directing an input signal to a group of outputs. Referring to FIG. 1, serial digital input signals from four sources are supplied to serial in, parallel out (SIPO) registers 10 which generate parallel output data words. Each SIPO is assigned a position in a sequence that contain all the SIPOs. Typically, the assigned position of a SIPO reflects the spatial location on the back panel of the routing switch of an input terminal, such as a connector, to which the SIPO is connected. A controller (not shown) read enables the SIPOs sequentially and accordingly the parallel output data words are placed sequentially on a bus 12. The controller controls the read enable supplied to the SIPOs and the state of the bus 12 so that the data words are placed on the bus in successive bus operating cycles. Consequently, the position of a data word from a particular SIPO in the sequence of bus operating cycles depends strictly on the assigned position of the SIPO The sequence of data words is written to successive addresses in a memory 14, and the address to which a data word is written depends strictly on the position of the data word in the sequence of bus operating cycles and hence on the spatial location of the input terminal at which the signal from which the data words were derived was received. The data words are read from the memory 14 in strict order of address and placed on an output bus 16 in respective time slots of the bus operating cycle as four interleaved parallel digital signals. Thus, the SIPO registers 10 and the memory 14 map the input terminals of the switch to different respective time slots in the operating cycle of the output bus 16.

The output bus 16 is accessed by parallel in, serial out (PISO) registers 18 whose outputs are connected to the output terminals of the switch. Each register 18 accesses the bus 16 during one selected time slot of the bus operating cycle and thus selects the signal provided by one selected input terminal. Each PISO register 18 converts the parallel data of the selected signal to serial form and provides the serial data to the output terminal of the switch core.

The TDM switch core shown in FIG. 1 has some advantages over the rectangular crosspoint matrix, particularly with respect to cost of expansion. In the case of the TDM switch core, the cost of the switch core depends on the sum of the number of inputs and the number of outputs but the number of inputs that can be supported is limited by the bandwidth of the bus 16.

Figure 2:
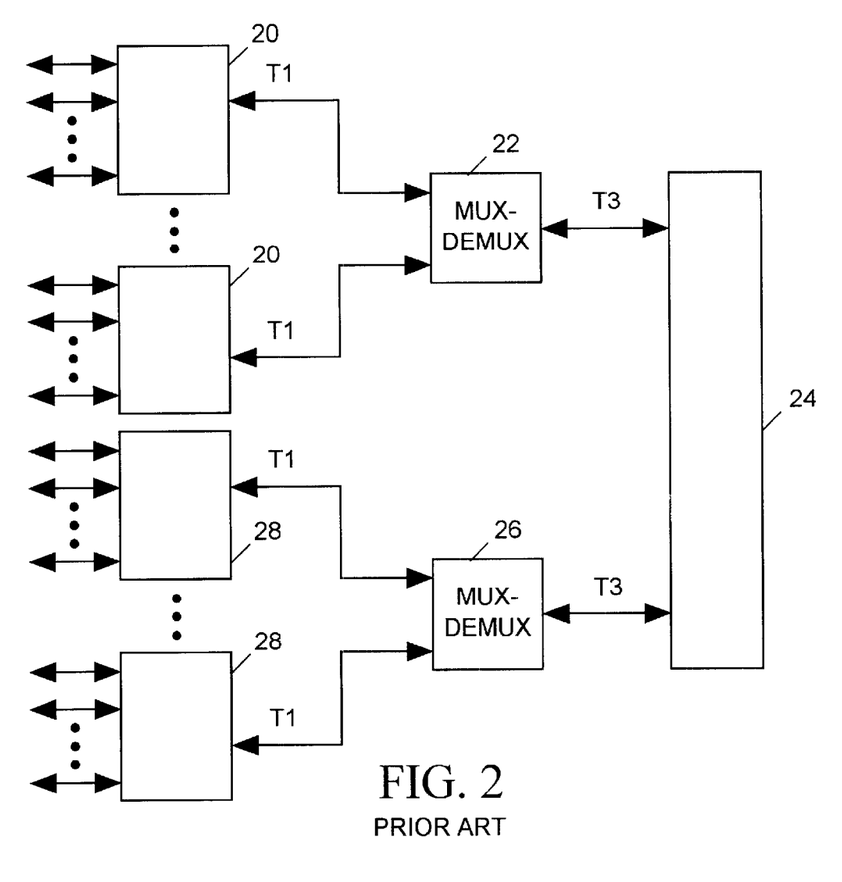
FIG. 2 is a schematic illustration of the public telephone network.

Referring to FIG. 2, the public telephone network is built around numerous switching offices each of which includes a point-to-point (i.e. non-broadcast) router 20 having bidirectional subscriber lines connected to the subscriber stations served by that switching office. The router 20 allows any one of the subscriber lines to be connected to any other subscriber line connected to that router. The router also has a so-called T1 line which is connected to a multiplexer-demultiplexer (mux-demux) 22 which also receives T1 lines from other routers and connects the several T1 lines to a common T3 line. The T3 line is connected over the backbone 24 of the public network to another T3 line which is connected to a mux-demux 26 at another switching office, which is spatially remote from the first switching office, the mux-demux 26 being connected by multiple T1 lines to multiple routers 28. The arrangement shown in FIG. 2 allows each subscriber station to be connected to each other subscriber station without need for a single enormous router to which every subscriber line is connected, but is subject to disadvantage because the routers are blocking, and consequently even though the subscriber line of a particular subscriber station might not be in use, it is not always possible to make a connection to that station.

SUMMARY OF THE INVENTION

According to a first aspect of the present invention there is provided a routing switch comprising a first router module having N1 signal input terminals, M1 signal output terminals, an expansion input terminal and an expansion output terminal and including a means for routing a signal received at any one of the N1 signal input terminals selectively to any one or more of the output terminals and for routing a signal received at the expansion input terminal selectively to any one or more of the N1 signal output terminals, and a second router module having N2 signal input terminals, M2 signal output terminals, an expansion input terminal and an expansion output terminal and including a means for routing a signal received at any one of the N2 signal input terminals selectively to any one or more of the output terminals and for routing a signal received at the expansion input terminal selectively to any one or more of the M2 signal output terminals, and wherein the expansion output terminal of the first router module is connected to the expansion input terminal of the second router module and the expansion output terminal of the second router module is connected to the expansion input terminal of the first router module.

According to a second aspect of the present invention there is provided a router module having N signal input terminals, M signal output terminals, an expansion input terminal and an expansion output terminal and including a router means for routing a signal received at any one of the N signal input terminals to any one or more of the output terminals and for routing a signal received at the expansion input terminal to any one or more of the M signal output terminals, the router means including a switch core for switching serial digital data streams, the switch core including N SIPO registers which convert serial digital data to parallel form, an input bus which reads the N SIPO registers sequentially, a first memory which buffers parallel data on the input bus to a first intermediate bus, a second memory which buffers parallel data on the first intermediate bus to a second intermediate bus, an output expansion interface connected to the first intermediate bus for supplying the parallel data on the first intermediate bus to the expansion output terminal, an input expansion interface for receiving data from the input expansion terminal and placing the data on the second intermediate bus, a third memory for buffering the data on the second intermediate bus onto an output bus, and M PISO registers for reading the output bus during selected time slots and converting the parallel data to serial form.

According to a third aspect of the present invention there is provided a router module having N signal input terminals, M signal output terminals, an expansion input terminal and an expansion output terminal and including a router means for routing a signal received at any one of the N signal input terminals to any one or more of the output terminals and for routing a signal received at the expansion input terminal to any one or more of the M signal output terminals, wherein the router module includes a switch core for switching serial digital data streams, the switch core including N1 SIPO registers which convert serial digital data to parallel form, an input expansion interface for receiving data from the input expansion terminal and providing parallel output data, a memory means which receives and temporarily stores parallel data provided by the N1 SIPO registers and parallel output data provided by the input expansion interface, an output expansion interface connected to the expansion output terminal, M PISO registers connected to the M signal output terminals, and memory output means for selectively providing data read from the memory means to the output expansion interface and the PISO registers.

According to a fourth aspect of the present invention there is provided a routing switch comprising n routers (n>1) and wherein each router comprises p router modules (p≧1) each having a plurality of signal input terminals, a plurality of signal output terminals, n−1 expansion input terminals and n−1 expansion output terminals and including a means for routing a signal received at any one of its signal input terminals to any one or more of its output terminals and for routing a signal received at any one of the expansion input terminals to any one or more of the signal output terminals, and an expansion interconnect network whereby each expansion output terminal of the ith router module (i=1 ... p) of the jth router (j=1 ... n) is connected to an expansion input terminal of ith router module of a router other than the jth router.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 3:
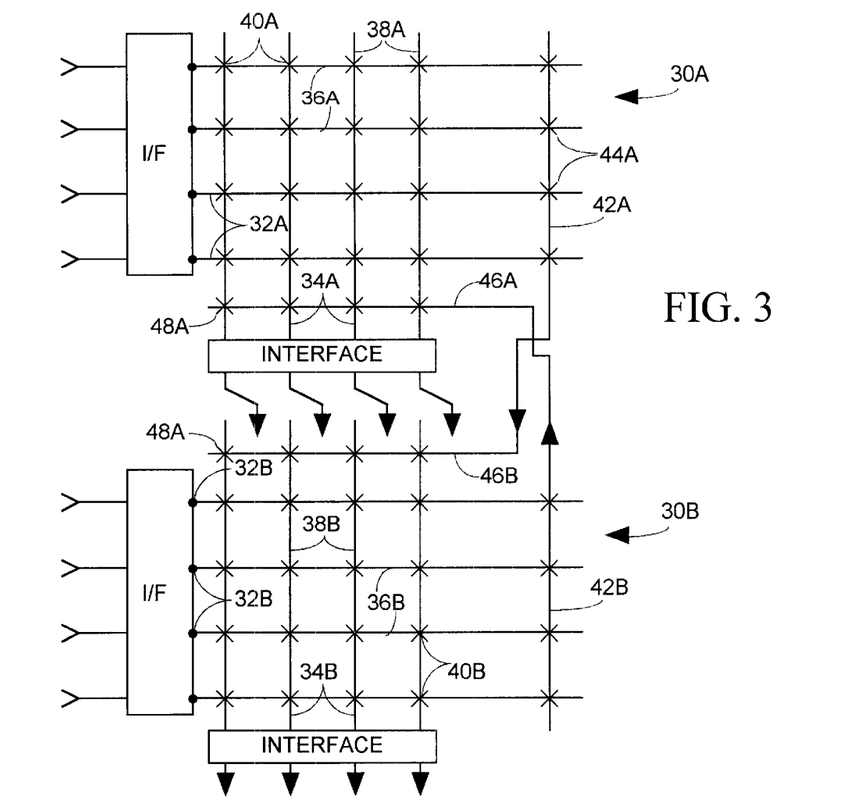
FIG. 3 illustrates schematically a first switch core in accordance with the present invention.

The switch core illustrated in FIG. 3 is used in a routing switch having eight input terminals, for connection to respective signal sources, and eight output terminals, for connection to respective destinations. The switch core is composed of two switch modules 30A, 30B. Each switch module has four signal inputs 32 connected (typically through interface circuitry) to respective input terminals of the routing switch and four signal outputs 34 connected (again through interface circuitry) to respective output terminals of the routing switch. Each switch module 30 has four input conductors 36 connected to its signal inputs 32 respectively and four output conductors 38 connected to the signal outputs 34 respectively. Each unique combination composed of one input conductor 36 and one output conductor 38 can be selectively connected by a switch element 40. Each switch module 30 also includes an output expansion conductor 42, which can be connected to any one of the input conductors 36 by switch elements 44, and an input expansion conductor 46, which can be connected to any one of the output conductors 38 by switch elements 48. The output expansion conductor 42A of the module 30A is connected to the input expansion conductor 46B of the module 30B, and vice versa. It will be seen that although the switch core shown in FIG. 3 has eight inputs and eight outputs, it has fewer than 64 switch elements.

It will be appreciated that the switch core shown in FIG. 3 is limited by the fact that in order to avoid collision of the signals on the conductor 42A, at any one time only one of the switch elements 44A of the module 30A can be closed. This limitation could be avoided by providing multiple output expansion conductors and input expansion conductors for each switch module, but when the number of inputs and outputs of each module is relatively small, addition of extra expansion conductors is not cost effective. However, for larger numbers of inputs and outputs, it can be cost effective to provide multiple-expansion conductors.

Figure 4:
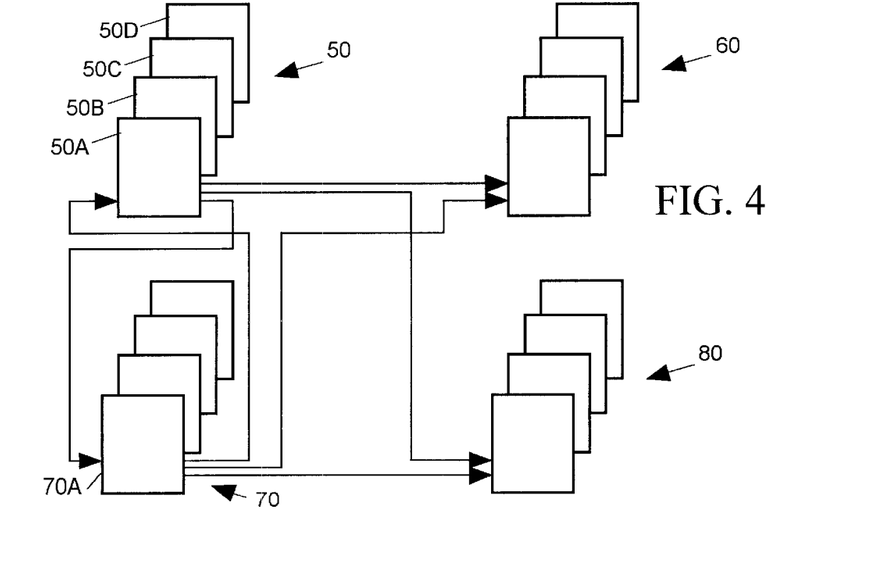
FIG. 4 illustrates schematically a second switch core in accordance with the present invention.

Referring to FIG. 4, a 1024×1024 routing switch is composed of four 256×256 routers 50, 60, 70 and 80. Each of the four routers is in turn composed of four 256×64 router modules A, B, C and D. The inputs of the four modules A, B, C and D are bussed, and accordingly each router serves only 256 inputs and all 256 input signals of that router are available to each of the router modules. The outputs of the four modules are not bussed and therefore each module serves a unique set of 64 outputs and the four-module router serves a total of 256 outputs. In order to make an input signal received by the router 50, for example, available to the outputs served by the routers 60, 70 and 80, each of the router modules 50A, 50B, 50C and 50D has three output expansion terminals which are connected respectively to input expansion terminals of the corresponding modules of the three routers 60, 70 and 80. The output expansion terminals of the router modules 50A and 70A are shown in FIG. 4.

The routing switch shown in FIG. 4 may be used for switching AES3 serial data streams, in which case the 256 inputs of each router module receive respective AES3 data streams. The AES3 data stream is composed of frames. Each AES3 frame represents one two-channel audio sample and is composed of two subframes, each of 32 bits. The subframes are conventionally referred to as subframe A and subframe B. The AES3 data streams may be at 96 kS/s, corresponding to 6.144 Mb/s (96 kS/s*32 bits/subframe*2 subframes/sample). Operation of the routing switch requires that the data streams received at the input terminals be synchronous and time aligned. In general, fewer than 256 of the data streams received at the inputs of the router module will convey information that is to be routed to an output of the router, and the data streams that do not convey useful information may be AES3 silence.

Figure 5:
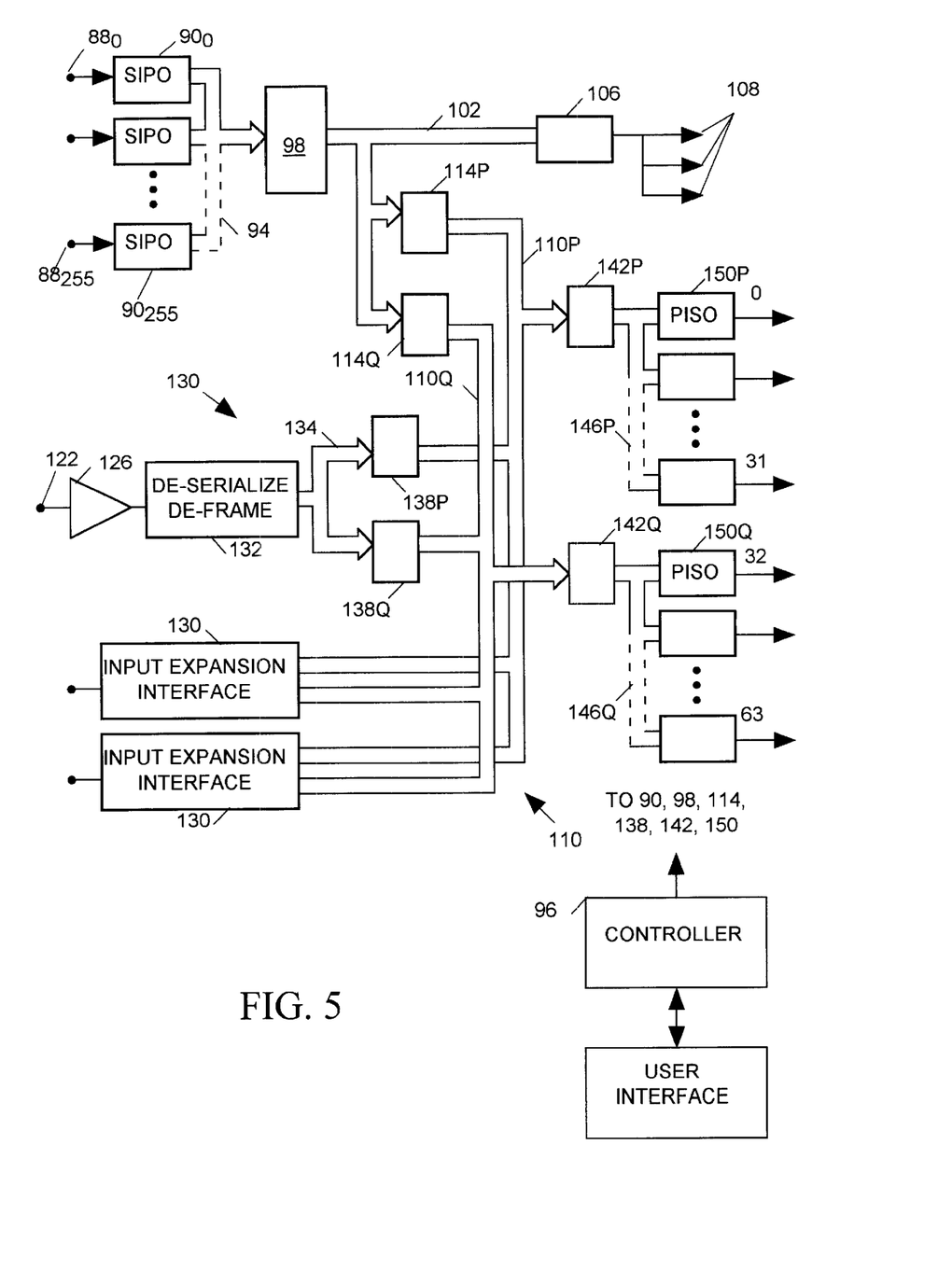
FIG. 5 illustrates in greater detail a router module of the second switch core.

Referring to FIG. 5, the serial data streams received at the inputs 88 of a router module are converted to 32-bit wide parallel form, each word containing one subframe of an AES3 frame, by respective SIPO registers 90. Each SIPO is assigned a position in a sequence that contains all 256 SIPOs. For example, the position of the SIPO in the sequence might be the same as the subscript assigned to the SIPO in FIG. 5. A controller 96 read enables the SIPOs sequentially, in accordance with the assigned positions in the sequence, and accordingly the parallel data words are placed sequentially on an input data bus 94. The bus 94 operates at 24.576 MHz (96 kS/s*2 subframes/sample*256 data streams) and the controller 96 controls the read enable signals supplied to the SIPOs and controls the timing of the operating cycles of the bus 94 so that the parallel data words are placed on the bus in successive operating cycles of the bus. The data words placed on the input bus 94 during the successive operating cycles are written to a memory 98 and are read from the memory 98 onto a first intermediate bus 102. The duration of the operating cycle of the bus 102 is 512 times the duration of the operating cycle of the bus 94, but the controller 96 divides the operating cycle of the bus 102 into 512 time slots.

The memory 98 is composed of two pages. During one succession of 512 operating cycles of the bus 94, the data words on the input bus are written to one page of the memory and data words previously written to the other page are read and placed on the first intermediate bus 102 in respective time slots of the operating cycle of the bus 102, and vice versa during the next succession of 512 operating cycles of the input bus 94. The memory 98 writes data words into the addresses of the selected page in strict order of time. During the read operation, the data words stored in the page that is being read are placed on the bus 102 in strict order of address. The bus 102 carries all 256 input signals, in time interleaved fashion.

Depending on timing constraints, the two 32-bit words derived from one AES3 frame might be placed on the input bus 94 either in consecutive operating cycles of the bus, so that they are written into consecutive addresses of the memory 98, or in two cycles that are spaced by 255 cycles, each containing one data word from each of the other SIPOs.

The data on the bus 102 is written to an output expansion interface 106 which serializes, frames and scrambles the parallel data and provides a serial output data stream at about 1.56 Gb/s. The output expansion interface has three bussed outputs 108 which are connected to the output expansion terminals of the router module. The input expansion terminals 122 of the router module are connected to respective input expansion interfaces 130.

The first intermediate bus 102 is also coupled to a second intermediate bus 110 having two parallel segments 110P and 110Q. Specifically, a memory 114P buffers the data on the first intermediate bus onto the segment 110P of the second intermediate bus and a memory 114Q buffers the data on the first intermediate bus onto the segment 110Q of the second intermediate bus. The memories 114P and 114Q would generally be composed of two pages, which would operate analogously to the two pages of the memory 98. The memory 114P, for example, writes the data on the bus 102 into its addresses in strict order of time slot during the operating cycle of the bus 102 and reads the data onto the bus segment 110P in strict order of address and accordingly the sequence of data words on the first intermediate bus 102 is preserved on the segment 110P of the second intermediate bus. The operating cycle of each segment of the bus 110 is of the same duration as the operating cycle of the bus 102, but whereas the operating cycle of the bus 102 is divided into 512 time slots, the operating cycle of each segment of the bus 110 is divided into 2048 time slots. The controller 96 controls the operation of the memories 114P and 114Q so that the 512 data words supplied by the first intermediate bus 102 during one operating cycle are placed in every fourth time slot during the operating cycle of the second intermediate bus 110. Each segment of the second intermediate bus operates at about 100 MHz, which is four times the speed necessary to accommodate the data provided by the first intermediate bus 102.

Each router module has three input expansion terminals 122 which receive the serial output data streams provided by the output expansion interfaces of the corresponding modules of the other three routers respectively. The three serial data streams each carry 256 input signals, from the corresponding modules of the other three routers respectively.

Each terminal 122 is connected to an input expansion interface 130 which includes a signal buffer 126 and a serial-to-parallel converter 132 which deserializes and deframes the serial input data stream received at the input expansion terminal 122. The resulting parallel data on the input expansion bus 134 is read in tandem both by a memory 138P and by a memory 138Q. The memories 138P and 138Q serve to buffer the parallel data onto the two parallel segments 110P and 110Q respectively of the second intermediate bus 110.

The controller 96 coordinates the write cycles of the memories 138P of each input expansion interface with each other and with the write cycles of the memory 114P so that the data words of the four data streams are interleaved on the segment 110P of the bus 110, and similarly coordinates the write cycles of the memories 138Q and 114Q so that the four data streams are interleaved on the segment 110Q of the bus 110. Consequently, each bus segment carries all 1024 input signals and each operates at about 100 MHz. Each input of the routing switch is mapped to one pair of time slots in the operating cycle of each segment of the bus 110, one time slot of the pair containing subframe A of the data stream received at that input of the routing switch and the other time slot containing subframe B of that data stream.

The router module includes 64 PISO registers 150 in two groups of 32. The PISOs 150P are connected to outputs 0–31 of the router module and the PISOs 150Q are connected to the outputs 32–63. Each of the outputs is connected to an output terminal, such as a connector, which is connected to a signal destination. The controller selects one or more destinations that are to receive a particular input signal by selecting the PISOs that are connected to those destinations.

The data on the segment 110P of the bus 110 is written into a memory 142P and the contents of the memory 142P are placed on an output bus 146P, which is accessed by the PISOs 150P. Similarly, the data on the bus segment 110Q is written into a memory 142Q and the contents of the memory 142Q are placed on an output data bus 146Q, which is accessed by the PISOs 150Q. In order to route the signal received at one of the inputs of the routing switch to one of the outputs served by the router module, the controller selects the PISO that is connected to the particular output and issues a command to that PISO to read the bus 142P or 142Q, as the case may be, during the pair of time slots to which the particular input is mapped. The selected PISO reads the bus during the selected pair of time slots, converts the parallel data to serial form, and provides the desired signal at the desired output.

Since the signals from all 1024 inputs of the routing switch are available on each segment of the bus 110, each of the input signals is available to each of the output terminals of the router module. It will be appreciated that a routing switch having the architecture described with reference to FIGS. 4 and 5 requires approximately four times the resources of the router 50, for example, rather than 16 times the resources, as would be required using a conventional rectangular crosspoint matrix.

In practice, each of the PISOs 150 is included in an output processor, which also includes an AES3 encoder for combining the two subframes read from the bus 146P or 146Q to generate an AES3 frame.

In a development of the router module shown in FIG. 5, the output processor does not serve merely to convert a series of pairs of 32 bit data words received from a single source 88 into an AES3 data stream but may instead be used to manipulate data words received from two or more signal sources to generate the AES3 data stream. To support this function, an additional level of time division multiplexing takes place between the memories 142 and the output processors. Thus, referring to FIG. 6, a memory 162 having 1024 addressable locations has a write port connected to the bus 146P. The memory 162 has 32 blocks of addresses associated with the output processors 166 respectively and each block contains 32 addressable locations. Since every input of the routing switch is mapped to a pair of time slots in the operating cycle of the bus 146P, a data word received at any input of the routing switch can be written to any one or more locations of the memory 162 during the appropriate time slot allocated to that input. The actual locations to which a given data word is written is determined by the controller 96. During a given time slot in the operating cycle of the bus 146P, the controller write enables each of the memory locations in the memory 162 into which the data word placed on the bus 146P in that time slot is to be written. At the end of an operating cycle of the bus 146P, each memory location of the memory 162 contains a 32 bit word.

Figure 6:
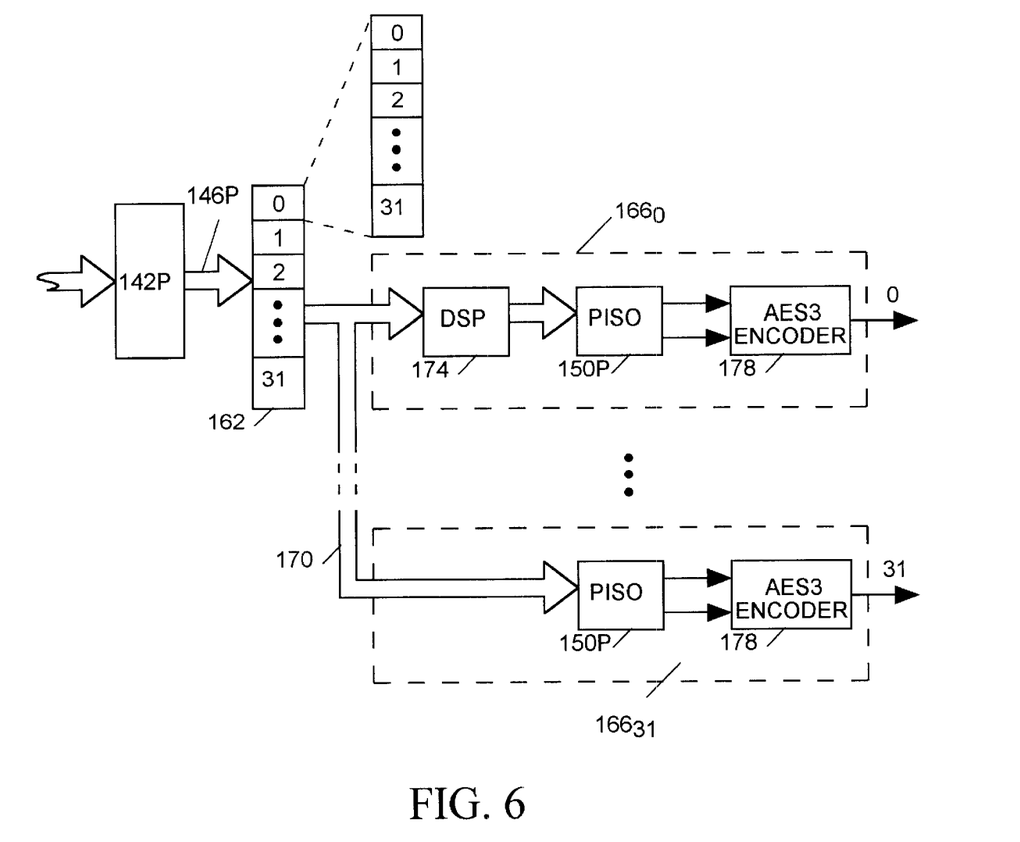
FIG. 6 is a partial schematic illustration of a modification of the router module shown in FIG. 5.

The read port of the memory 162 is connected to a bus 170, and during the read operation, the data words stored in the memory 162 are read out and placed on the bus 170 in a sequence that depends strictly on address. Specifically, the data word in location 0 of block 0 is read first, followed by location 0 of block 1 and so on until location 0 of block 31, followed by location 1 of block 0, location 1 of block 1, etc. until all 1024 data words have been read. The output processors 166 read the bus 170 in a repeating sequence such that the data words read from block 0 of the memory 162 are supplied sequentially to the output processor $166_0$, and similarly for blocks 1–31.

The output processor includes a digital signal processor (DSP) 174. The functions of the DSPs 174 of several output processors may be shared by a single commercially available DSP integrated circuit.

The DSP 174 receives the 32 data words read from the block of the memory 162 associated with the specific output processor and manipulates the data words read from locations 0–15 of the block to generate a first data word and manipulates the data words read from locations 16–31 of the block to generate a second data word.

The DSP 174 supplies the two data words, generated from the data words read from locations 0–15 and 16–31 respectively, to the PISO 150P, which converts the data words to parallel form and supplies them to an AES3 encoder 178. The AES3 encoder uses the first and second data words to generate subframes A and B respectively of an AES3 frame. In this way, it is possible to employ the output processor to create a range of audio effects.

As illustrated by the output processor $166_{31}$, the output processor need not include a DSP for manipulating data words but may be a simple signal routing processor, which delivers the AES3 data stream received at a single input of the routing switch to a single output of the routing switch, in which case the output processor utilizes the data words read from the locations 0 and 16 to generate subframes A and B respectively of the AES3 data stream, the data words in locations 1–15 and 17–31 being unused. Since the data words in locations 1–15 and 17–31 are not used to generate the AES3 data stream, the source from which these words are derived can be selected arbitrarily; the controller may assign a common default source for all unused data words for all the simple routing processors.

FIG. 6 shows the shared access memory 162 connected to the bus 146P for supplying data words to the output processors $166_0$–$166_{31}$ via the TDM bus 170, but it will be appreciated that an additional shared access memory and TDM bus are provided for connecting the bus 146Q to the other 32 output processors.

It will be appreciated that the invention is not restricted to the particular embodiment that has been described, and that variations may be made therein without departing from the scope of the invention as defined in the appended claims and equivalents thereof. For example, although the invention has been described with reference to routing AES3 data streams, in which the two channels, composed bf subframe A and subframe B respectively, may be related, e.g. as encoded left and right stereo channels, the invention is not restricted to the two channels of the data streams being related. In this case, each router module connects 512 primary signal sources and 1536 expansion sources to 128 primary destinations and 1920 expansion destinations. Further, the invention is not restricted to use with AES3 data streams and is applicable to other signal formats, including video signal formats. The invention is not restricted to the use of separate buses 94 and 102 for writing to and reading from the memory 98, and a common bus may be used, subject to timing constraints. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. A routing switch having (N1+N2) input terminals and (M1+M2) output terminals and comprising:

a first router module having Ni signal input terminals, an expansion input terminal and (M1+1) output terminals, including M1 signal output terminals and an expansion output terminal, the first router module including a means for routing a signal received at any one of the N1 signal input terminals selectively to any one or more of the (M1+1) output terminals and for routing a signal received at the expansion input terminal selectively to any one or more of the M1 signal output terminals, a second router module having N2 signal input terminals, an expansion input terminal and (M2+1) output terminals, including M2 signal output terminals and an expansion output terminal, the second router module including a means for routing a signal received at any one of the N2 signal input terminals selectively to any one or more of the (M2+1) outpuL terminals and for routing a signal received at the expansion input terminal selectively to any one or more of the M2 signal output terminals, input interface circuitry connecting said (N1+N2) input terminals of the routing switch respectively to the N1 signal input terminals of the first router module and the N2 signal input terminals of the second router module, and output interface circuitry connecting the M1 signal output terminals of the first router module and the M2 signal output terminals of the second router module to said (M1+M2) output terminals of the routing switch respectively, and wherein the expansion output terminal of the first router module is connected to the expansion input terminal of the second router module and the expansion output terminal of the second router module is connected to the expansion input terminal of the first router module, and the first router module includes a switch core for switching serial digital data streams, the switch core including N1 SIPO registers which convert serial digital data to parallel form, an input expansion interface for receiving data from the expansion input terminal and providing parallel output data, a memory means which receives and temporarily stores parallel data provided by the N1 SIPO registers and parallel output data provided by the input expansion interface, an output expansion interface connected to the expansion output terminal, M PISO registers connected to the M signal output terminals, and memory output means for selectively providing data read from the memory means to the output expansion interface and the PISO registers.

2. A routing switch according to claim 1, wherein the first router module includes a rectangular crosspoint matrix composed of N1 input conductors connected to the signal input terminals respectively, M1 output conductors connected to the signal output terminals respectively, an input expansion conductor connected to the expansion input terminal, an output expansion conductor connected to the expansion output terminal, N1*M1 switch elements each operable selectively for connecting a unique combination of one input conductor and one output conductor, N1 switch elements operable selectively for connecting the output expansion conductor to any one of the input conductors and M1 switch elements operable selectively for connecting the output expansion conductor to any one of the M1 output conductors.

3. A routing switch according to claim 1, wherein the memory means comprises a first memory which receives and temporarily stores parallel data provided by the N1 SIPO registers and a second memory which receives and temporarily stores parallel output data provided by the input expansion interface, and the memory output means comprises a first intermediate bus, a second intermediate bus, an output bus, a third memory and a fourth memory, and wherein the first intermediate bus supplies data from the first memory to the output expansion interface and to the third memory, the second intermediate bus supplies data from both the second memory and the third memory to the fourth memory, and the output bus supplies data from the fourth memory to the PISO registers.

4. A routing switch having (N1+N2) input terminals and (M1+M2) output terminals and comprising:

a first router module having N1 signal input terminals, an expansion input terminal and (M1+1) output terminals,, including M1 signal output terminals and an expansion output terminals, the first router module including a means for routing a signal received at any one of the N1 signal input terminals selectively to any one or more of the (M1+1) output terminals and for routing a signal received at the expansion input terminal selectively to any one or more of the M1 signal output terminals, a second router module having N2 signal input terminals, an expansion input terminal and (M2+1) output terminals, including M2 signal output terminals and an expansion output terminal, the second router module including a means for routing a signal received at any one or more of the N2 signal output terminals selectively to any one or more of the (M2+1) output terminals and for routing a signal received at the expansion input terminal selectively to any one or more of the M2 signal output terminals, input interface circuitry connecting said (N1+N2) input terminals of the routing switch respectively to the N1 signal input terminals of the first router module and the N2 signal input terminals of the second router module, and output interface circuitry connecting the M1 signal output terminals of the first router module and the M2 signal output terminals of the second router module to said (M1+M2) output terminals of the routing switch respectively, wherein the expansion output terminal of the first router module is connected to the expansion input terminal of the second router module and the expansion output terminal of the second router module is connected to the expansion input terminal of the first router module, wherein the first router module includes a switch core for switching serial digital data streams, the switch core including N1 SIPO registers which convert serial digital data to parallel form, an input bus which the N1 SIPO registers access sequentially, a first memory which buffers parallel data on the input bus to a first intermediate bus, a second memory which buffers the data on the first intermediate bus to a second intermediate bus, an output expansion interface connected to the first intermediate bus for supplying the parallel data on the first intermediate bus to the expansion input terminal of the second router module, an input expansion interface for receiving data from the expansion output terminal of the second router module and placing the data on the second intermediate bus, a third memory for buffering the data on the second intermediate bus onto an output bus, and M1 PISO registers which access the output bus during selected time slots and converting the parallel data to serial form.

5. A routing switch according to claim 4, wherein the second intermediate bus comprises a first intermediate bus segment and a second intermediate bus segment, the output bus comprises a first output bus segment and a second output bus segment, the second memory comprises a first memory segment for buffering data on the first intermediate bus onto the first intermediate bus segment and a second memory segment for buffering data on the first intermediate bus onto the second intermediate bus segment, and the third memory comprises a first memory segment for buffering data on the first intermediate bus segment onto the first output bus segment and a second memory segment for buffering data on the second intermediate bus segment onto the second output bus segment.

6. A routing switch according to claim 4, wherein the input expansion interface includes an input expansion bus for receiving data from the second router module and a memory for buffering the data on the input expansion bus onto the second intermediate bus.

7. A routing switch according to claim 6, wherein the output expansion interface includes a means for converting parallel data on the first intermediate bus to serial form and the input expansion interface includes a means for converting serial data received from the expansion output terminal of the second router module to parallel form.

8. A router module having N signal input terminals, M signal output terminals, an expansion input terminal and an expansion output terminal and including a router means for routing a signal received at any one of the N signal input terminals to any one or more of the output terminals and for routing a signal received at the expansion input terminal to any one or more of the M signal output terminals, the router means including a switch core for switching serial digital data streams, the switch core including N SIPO registers which convert serial digital data to parallel form, an input bus which reads the N SIPO registers sequentially, a first memory which buffers parallel data on the input bus to a first intermediate bus, a second memory which buffers parallel data on the first intermediate bus to a second intermediate bus, an output expansion interface connected to the first intermediate bus for supplying the parallel data on the first intermediate bus to the expansion output terminal, an input expansion interface for receiving data from the expansion input terminal and placing the data on the second intermediate bus, a third memory for buffering the data on the second intermediate bus onto an output bus, and M PISO registers for reading the output bus during selected time slots and converting the parallel data to serial form.

9. A router module having N signal input terminals, M signal output terminals, an expansion input terminal and an expansion output terminal and including a router means for routing a signal received at any one of the N signal input terminals to any one or more of the output terminals and for routing a signal received at the expansion input terminal to any one or more of the M signal output terminals, wherein the router module includes a switch core for switching serial digital data streams, the switch core including N1 SIPO registers which convert serial digital data to parallel form, an input expansion interface for receiving data from the expansion input terminal and providing parallel output data, a memory means which receives and temporarily stores parallel data provided by the N1 SIPO registers and parallel output data provided by the input expansion interface, an output expansion interface connected to the expansion output terminal, M PISO registers connected to the M signal output terminals, and memory output means for selectively providing data read from the memory means to the output expansion interface and the PISO registers.

10. A router module according to claim 9, wherein the memory means comprises a first memory which receives and temporarily stores parallel data provided by the N2 SIPO registers and a second memory which receives and temporarily stores parallel output data provided by the input expansion interface, and the memory output means comprises a first intermediate bus, a second intermediate bus, an output bus, a third memory and a fourth memory, and wherein the first intermediate bus supplies data from the first memory to the output expansion interface and to the third memory, the second intermediate bus supplies data from both the second memory and the third memory to the fourth memory, and the output bus supplies data from the fourth memory to the PISO registers.

11. A routing switch comprising n routers (n>1) and wherein each router comprises p router modules (p≧1) each having a plurality of signal input terminals, a plurality of signal output terminals, (n−1) expansion input terminals and (n−1) expansion output terminals and including a means for routing a signal received at any one of its signal input terminals to any one or more of its output terminals and for routing a signal received at any one of the expansion input terminals to any one or more of the signal output terminals, and an expansion interconnect network whereby each expansion output terminal of the ith router module (i=1 . . . p) of the jth router (j=1 . . . n) is connected to an expansion input terminal of the ith router module of a router other than the jth router, and wherein at least one of the p router modules includes a switch core for switching serial digital data streams, the switch core including a plurality of SIPO registers which convert serial digital data to parallel form, an input expansion interface means for receiving data from the (n−1) expansion input terminals and providing parallel output data, a memory means which receives and temporarily stores parallel data provided by the SIPO registers and parallel output data provided by the input expansion interface, an output expansion interface means connected to the (n−1) expansion output terminals, a plurality of PISO registers connected to the signal output terminals, and memory output means for selectively providing data read from the memory means to the output expansion interface and the PISO registers.

* * * * *

UNITED STATES PATENT AND TRADEMARK OFFICE
CERTIFICATE OF CORRECTION

PATENT NO. : 6,680,939 B1
DATED : January 20, 2004
INVENTOR(S) : Donald S. Lydon et al.

It is certified that error appears in the above-identified patent and that said Letters Patent is hereby corrected as shown below:

<u>Column 8,</u>
Line 66, "Ni" should be deleted and replaced with -- N1 --.

<u>Column 9,</u>
Line 14, "outpuL" should be deleted and replaced with -- output --.

Signed and Sealed this

Thirtieth Day of March, 2004

JON W. DUDAS
*Acting Director of the United States Patent and Trademark Office*